Aug. 24, 1965
J. E. BUDOVEC
3,202,947
EPOXY INSULATED TRANSFORMER HAVING TRIS-B-CHLOROETHYLPHOSPHATE
AND HYDRATED ALUMINA IN THE INSULATION
Filed Feb. 16, 1961
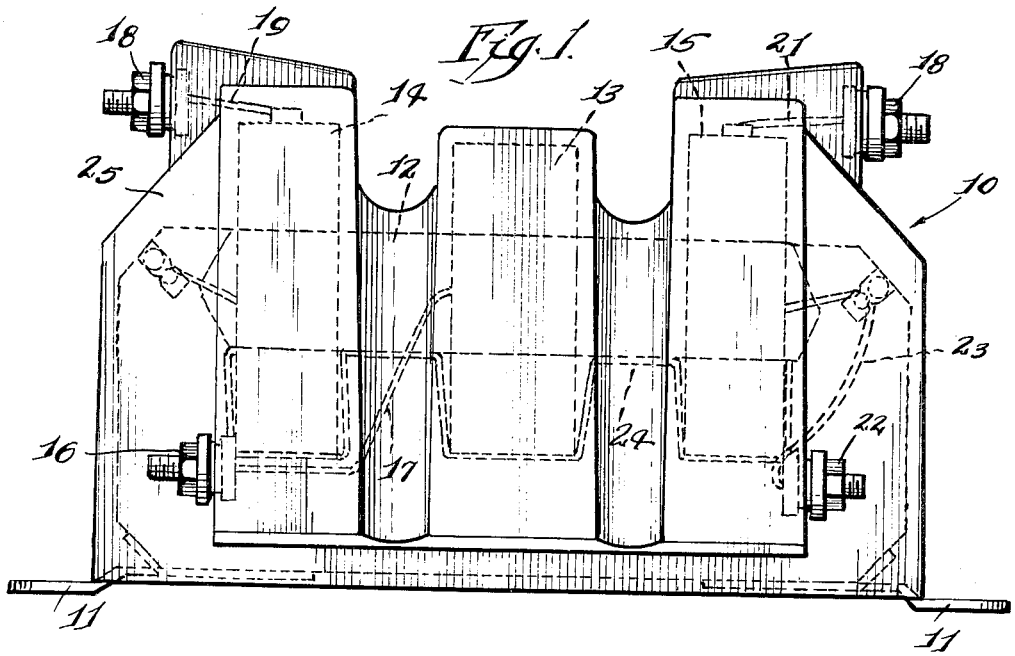
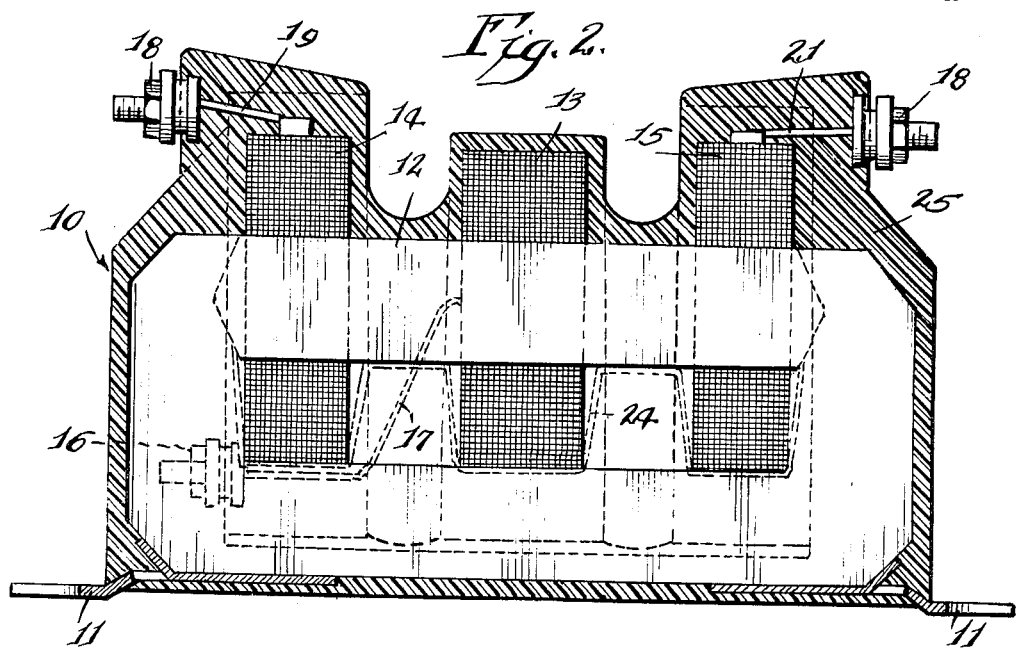
Inventor.
Joseph E. Budovec.
By Zabel, Baker, York,
Jones & Dithmar
Attorneys.

United States Patent Office 3,202,947
Patented Aug. 24, 1965

3,202,947
EPOXY INSULATED TRANSFORMER HAVING TRIS-B-CHLOROETHYLPHOSPHATE AND HYDRATED ALUMINA IN THE INSULATION
Joseph E. Budovec, Berkeley, Ill., assignor to Jefferson Electric Company, Bellwood, Ill., a corporation of Delaware
Filed Feb. 16, 1961, Ser. No. 89,780
2 Claims. (Cl. 336—96)

The present invention relates to an epoxy resin for encapsulating or potting electrical members and more specifically to a new epoxy resin composition which is resistant to carbonizing and arc tracking and is flame resistant, and to an electrical transformer which is insulated and encased in the epoxy resin composition.

In the construction of electrical components, such as transformers, transistors and induction heating coils, thermoplastic or thermosetting resins have been used for protection and insulation. In particular, problems arise in the protection of transformers for luminous tubes where high voltage and low current are required to energize the gaseous arc discharge tubes. Porcelain insulators have been tried, but they are extremely vulnerable to breakage because of their fragile nature. Also, many luminous tubes are mounted in signs that are installed out-of-doors, and rain, the presence of condensation in areas of high humidity, and contamination in the atmosphere along the sea-coasts and in industrial areas contribute to a high incidence of premature failure of the transformers.

Epoxy resins and phenolic resins have been extensively use for potting or encapsulating compounds on electrical components such as transformers. However, problems have arisen where a high voltage-low current transformer is potted due to the arc tracking, carbonizing, and deterioration from heat and/or exposure to flames. Under test procedures, a phenolic resin shows arcing and carbonizing in three seconds. A regular epoxy resin also showed arc tracking and carbonizing tendencies after a relatively short period of time.

The present invention comprehends epoxy resins for encapsulation or potting of these luminous tube transformers for protection from atmospheric contamination and resistance to arc tracking and flame exposure.

An epoxy resin composition to be acceptable for the purposes herein set forth must be flame resistant, must not support combustion and must not melt or run at elevated temperatures. Also, there must be maximum impregnation since any voids contribute to breakdown or corona discharge. Therefore, the present invention is concerned with additives to the epoxy resin to achieve the above recited requirements.

Of particular importance in the epoxy resin composition is the addition of a flame retardant. Two particular materials have been found to be particularly effective in low quantities to provide flame resistance for the resin. These two materials are tris-B-chlorethyl phosphate and chlorendic anhydride. The two additives can be used together in the resin or the tris-B-chlorethyl phosphate can be solely utilized. In either case, unique properties of flame resistance are imparted to the resin.

Of the materials which have been used as curing catalysts, maleic anhydride and phthalic anhydride have gained wide acceptance. The present invention comprehends the use of hexahydrophthalic anhydride as an activator. In the present invention, triggering agents for the activators or curing catalysts are also required, such as 2,4,6-tri(dimethylaminomethyl) phenol or dimethylaminomethyl phenol.

Among the objects of the present invention is the provision of an epoxy resin composition with a flame retardant, said flame retardant comprising tris-B-chloroethyl phosphate or a mixture of tris-B-chloroethyl phosphate and chlorendic anhydride. These additives prevent any burning except where a flame is applied on test and there is no indication of melting or running at elevated temperatures.

Another object of the present invention is the provision of an epoxy resin composition including a filler composed of one or more of the following materials: (1) hydrated alumina (approximately 44 micron particle diameter); (2) hydrated alumina (approximately 0.05 micron particle diameter); (3) mica (approximately 325 mesh) and (4) natural fibrous magnesium silicate. These filler materials are added to the epoxy resin to prevent carbonizing of the resin and arc tracking.

A further object of the present invention is the provision of a light, compact high voltage transformer which does not require fragile porcelain insulators. The transformer is substantially completely encased in a coating of an epoxy resin composition which provides a maximum or complete impregnation to insulate the transformer and protect said electrical component from moisture and contamination found in the atmosphere.

Additional objects and advantages of my invention should be apparent to those skilled in the art from the following description when considered in connection with the accompanying drawing, in which:

FIG. 1 is a front elevational view of an illustrative embodiment of a transformer which has been encased in the novel epoxy resin composition of the present invention.

FIG. 2 is a cross sectional view of the illustrated form of transformer to further show the epoxy resin surrounding or encompassing the electrical components.

This invention relates particularly to an epoxy resin which is liquid at room temperatures and is formed from the reaction of 2 to 3 moles of epichlorohydrin to 1 mole of bis-phenol (diphenylol propane). In the patent literature, the reaction to form an epoxy resin is disclosed as reacting the epichlorohydrin and the bis-phenol preferably under alkaline conditions by using a suitable alkaline catalyst, such as an alkaline metal hydroxide, in the presence of a suitable non-reactive soluble diluent, which may be recovered by distillation.

The liquid form of epoxy resin having a low viscosity has the following structure:

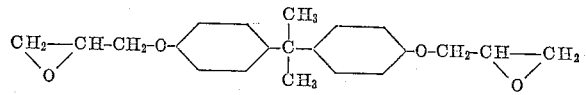

Longer chain molecules having higher molecular weights will cause increased viscosity. A long chain structure is shown as follows:

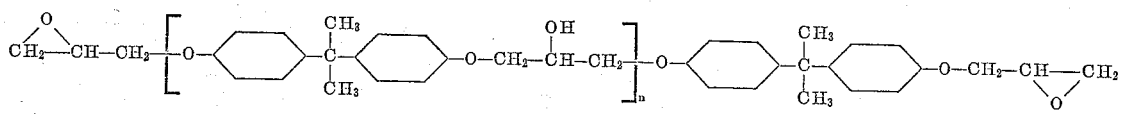

where $n$ is an integer of the series 1, 2, 3, etc. As $n$ increases, the viscosity of the resin does also, until the epoxy resin approaches a solid, fusible material.

When two moles of epichlorohydrin are reacted with one mole of bis-phenol, the reaction product is always a highly viscous liquid or even semi-solid. To provide a low viscosity resin, several procedures have been tested. One method is to add small amounts of a diluent to a high viscosity resin; a second method is to carry out the reaction with a large stoichiometric excess of epichlorohydrin. The third and most successful method is to carry out the initial reaction according to the standard procedure and then add a suitable amount of epichlorohydrin and water which is later recovered by azeotropic distillation. A suitable epoxy resin and method of making such resin is disclosed in the Moroson Patent No. 2,921,049.

The present invention relates to a novel composition comprising an epoxy resin containing a flame retardant compound which substantially increases the resin's resistance to arc tracking and flames. A test procedure of this epoxy resin with a flame retardant showed no arcing or tracking or carbonizing after two hours under the test conditions. The flame retardant compound is a mixture of tris-B-chlorethyl phosphate and chlorendic anhydride; however, the tris-B-chlorethyl phosphate may be used alone with excellent results.

With reference to the drawing, the illustrative form of transformer 10 includes a pair of outwardly extending feet 11 secured to a laminated core 12 of metal suitable for the purpose. A primary coil 13 is centrally wound on the core 12, and the secondary coils 14 and 15 are also wound on the core on either side of the primary coil 13.

Primary or low voltage terminals are shown positioned at one end of the core 12 and are connected to the ends of the primary coil 13 through lines 17. The secondary or high voltage terminals 18 are shown mounted near the top of the transformer 10 and are connected to the secondary coils 14 and 15 by lines 19 and 21, respectively. A ground terminal 22 is positioned at the end of the transformer 10 opposite to the primary contacts 16 and is connected to the midpoint of the secondary coils 14 and 15 via line 23. A line 24 connects the secondary coils 14 and 15 in series. The epoxy resin coating 25 encompasses the core and coils in a relatively thin layer providing complete impregnation and covering for the transformer except for the feet 11.

If both flame retardant compounds are used in the epoxy resin composition, one compound is preferably used in each of two parts of the total epoxy composition.

EXAMPLE I

Composition A: | Percent by weight
---|---
Epoxy resin | 24.22
Hydrated alumina (approximately 44 micron particle diameter—325 mesh) | 43.25
Hydrated alumina (approximately 0.05 micron particle diameter) | 10.00
Mica (approximately 325 mesh) | 3.00
Natural, fibrous magnesium silicate | 2.00
Tris-B-chlorethyl phosphate | 2.92

Composition B: |
---|---
Hexahydrophthalic anhydride | 6.05
Chlorendic anhydride | 8.55
2,4,6-tri (dimethylaminomethyl) phenol or dimethylaminomethyl phenol (percent of wt. of epoxy resin) | 0.005

Composition A is an oily liquid containing a low viscosity epoxy resin and the principal flame retardant. Composition B is a solid mixture which is melted to form a paste. When the transformer is to be encapsulated, composition B is blended with composition A and molded around the transformer in a suitable mold and heat set. The finished product showed complete impregnation and under test procedures for electric performance, impact, flammability, dielectric strength and arc tracking, the encapsulated transformer far exceeded previous potted components as to performance.

The hydrated alumina, mica and fibrous magnesium silicate in composition A are fillers for the resin and aid in the prevention of arc tracking and carbonizing of the epoxy resin. The flame retardants prevented any burning of the resin under test except where the test flame directly contacted the resin. Also, there was no melting or running of the resin when the test flame was applied. The hexahydrophthalic anhydride acted as the activator or curing catalyst for the resin, and the 2,4,6-tri-(dimethylaminomethyl) phenol or dimethylaminomethyl phenol acted as a trigger for the activator.

The chlorendic anhydride can be reduced in amount or even eliminated by increasing the amount of tris-B-chlorethyl phosphate in the composition.

EXAMPLE II

Composition A: | Percent by weight
---|---
Epoxy resin | 27.00.
Hydrated alumina (approximately 44 micron diameter) | 43.10.
Hydrated alumina (approximately 0.05 micron diameter) | 10.72.
Natural, fibrous magnesium silicate | 2.40.
Tris-B-chlorethyl phosphate | 9.98.

Composition B: |
---|---
Hexahydrophthalic anhydride | 6.75.
2,4,6-tri-(dimethylaminomethyl) phenol | 0.005% of wt. of epoxy resin.

Only the one flame proofing compound was used in this mixture, and the mixing and molding procedures were the same as recited in Example I. Under test procedures, this epoxy resin composition did not burn, melt or run, and the tests relating to impact, dielectric strength and arc tracking again substantially exceeded minimum requirements for potted electric components.

EXAMPLE III

Composition A: | Percent by weight
---|---
Epoxy resin | 30.19.
Hydrated alumina | 45.85.
Fibrous magnesium silicate | 1.00.
Tris-B-chlorethyl phosphate | 2.04.

Composition B: |
---|---
Hexahydrophthalic anhydride | 6.14.
Chlorendic anhydride | 14.48.
Dimethylaminomethyl phenol | 0.009% of wt. of epoxy resin.

Composition B is melted and blended with the liquid composition A. This compound is then molded around an electrical component in a suitable mold and heat cured. In this example, optimum flame resistance is provided since the tris-B-chloroethyl phosphate and chlorendic anhydride were slightly increased for the increase in the epoxy resin. The test procedures again disclosed excellent results with this material. The particle size of the hydrated alumina is not considered critical, but is chosen for maximum distribution in the final composition.

EXAMPLE IV

Composition A: | Percent by weight
---|---
Epoxy resin | 37.14.
Hydrated alumina | 42.20.
Mica (approximately 325 mesh) | 3.00.
Fibrous magnesium silicate | 3.27.
Tris-(dichloropropyl) phosphate | 3.12.

Composition B: |
---|---
Hexahydrophthalic anhydride | 7.94.
Chlorendic anhydride | 3.27.
2,4,6-tri-(dimethylaminomethyl) phenol | 0.01% of wt. of epoxy resin.

The two compositions were blended together, molded and cured according to the procedure cited in the previous examples. The tris-(dichloropropyl) phosphate was substituted for tris-B-chlorethyl phosphate and, under test conditions, flame resistance and arc tracking resistance again far exceeded characteristics of prior potting compounds. There was no arc tracking, but a white path on the resin was established. Upon application of a flame, burning occurred only where the resin was contacted by the flame.

The principal flame retardant, as noted in the above examples, falls under the general family of tris-chloroalkyl phosphates; said phosphates capable of use alone or in combination with chlorendic anhydride. The use of either above named phosphate gives excellent results for flame resistance.

EXAMPLE V

Composition A:                        Percent by weight
    Epoxy resin _____ 20.14.
    Hydrated alumina _____ 59.91.
    Fibrous magnesium silicate _____ 4.27.
    Tris-B-chlorethyl phosphate _____ 5.79.

Composition B:
    Hexahydrophthalic anhydride ____ 6.10.
    Chlorendic anhydride _____ 3.40.
    Dimethylaminomethyl phenol __ 0.005% of wt.
                                    of epoxy resin.

This composition was blended and molded according to the previously described procedure and the characteristics of the encapsulated electrical component again proved to excellent.

EXAMPLE VI

Composition A:                        Percent by weight
    Epoxy resin _____ 30.78.
    Hydrated alumina _____ 45.11.
    Mica _____ 4.21.
    Natural, fibrous magnesium silicate _____ 1.97.
    Tris-B-chlorethyl phosphate _____ 7.29.

Composition B:
    Hexahydrophthalic anhydride ____ 9.26.
    Chlorendic anhydride _____ 1.17.
    2,4,6-tri-(dimethylaminomethyl)
      phenol _____ 0.005% of wt.
                                    of epoxy resin.

This composition, when molded around an electrical component showed acceptable characteristics. However, this composition did not perform as well as the composition of Example I.

Each of the constituents in the novel composition has an operable range which will give satisfactory results for a potted electrical component to meet test standards. A preferred range of quantities of each constituent as set out in the following table will result in a superior potted electrical component where the amount of flame retardant is relatively low to effect savings in the cost of the final product and to provide excellent test characteristics.

Table I

| Constituent | Operable Range, percent | Preferred Range, percent |
|---|---|---|
| Epoxy resin | 20–50 | 20–30. |
| Hydrated alumina | 25–80 | 40–60. |
| Mica | 0–25 | 1–5. |
| Magnesium silicate (fibrous) | 0–20 | 1–5. |
| Tris-B-chlorethyl phosphate or Tris-(di chloropropyl) phosphate. | 2–10 | 2½–6. |
| Hexahydrophthalic anhydride | 5–12 | 6–8. |
| Chlorendic anhydride | 0–25 | 5–10. |
| 2,4,6-tri-(dimethylaminomethyl)phenol or Dimethylaminomethyl phenol. | 0.005–1.0% of wt. of epoxy resin. | 0.005–0.01% of wt. of epoxy resin. |

While this invention has been described with particular reference to the above examples, it should be understood that the invention is not limited thereto and reference should be had to the claims.

Having disclosed the invention, I claim:

1. An electrical transformer comprising a magnetic core, electrical windings disposed about the magnetic core, and a cured body of resinous insulation comprising a mixture of 20–50 percent of the reaction product having more than one epoxy group per molecule of epichlorohydrin and diphenylol propane, 25–80 percent of a filler consisting essentially of hydrated alumina, and a flame retardant comprising 2–10 percent tris-B-chlorethyl phosphate, 5–12 percent of hexahydrophthalic anhydride, 0.005–1.0 percent of a tertiary amine from the group consisting of 2,4,6-tri(diethylaminomethyl)-phenol and dimethylaminomethyl phenol; and 0–25 percent chlorendic anhydride said core and windings being embedded in said cured body of resinous insulation.

2. An electrical transformer comprising a magnetic core, electrical windings disposed about said core, and a cured body of resinous insulation comprising a mixture of 20–30 percent of the reaction product having more than one epoxy group per molecule of epichlorohydrin and diphenylol propane, 40–60 percent of a filler consisting essentially of hydrated alumina, 6–8 percent hexahydrophthalic anhydride, 2½–6 percent tris-B-chlorethyl phosphate, 0.005–1.0 percent of a tertiary amine from the group consisting of 2,4,6-tri-(dimethylaminomethyl)-phenol and dimethylaminomethyl phenol; and 5–10 percent chlorendic anhydride said core and windings being embedded in said cured body of resinous insulation.

References Cited by the Examiner

UNITED STATES PATENTS

| | | | |
|---|---|---|---|
| 2,710,844 | 6/55 | Thompson | 260—30.6 |
| 2,744,845 | 5/56 | Rudoff | 260—37 |
| 2,956,037 | 10/60 | Venable | 260—30.6 |
| 2,991,293 | 7/61 | Batzer et al. | 260—37 |
| 2,994,685 | 8/61 | Delmonte et al. | 260—47 |
| 2,997,527 | 8/61 | Kessel et al. | 260—37 |
| 3,003,977 | 10/61 | Hurwitz et al. | 260—30.6 |
| 3,118,858 | 1/64 | Frey et al. | 260—47 |

OTHER REFERENCES

The Condensed Chemical Dictionary, 5th Ed. 1956, Reinhold (see pages 115, 676, 728).

Lee et al.: "Epoxy Resins," McGraw-Hill, 1957 (pages 15, 94, 95, 148–151).

MORRIS LIEBMAN, *Primary Examiner.*

MILTON STERMAN, *Examiner.*